Patented June 11, 1929.

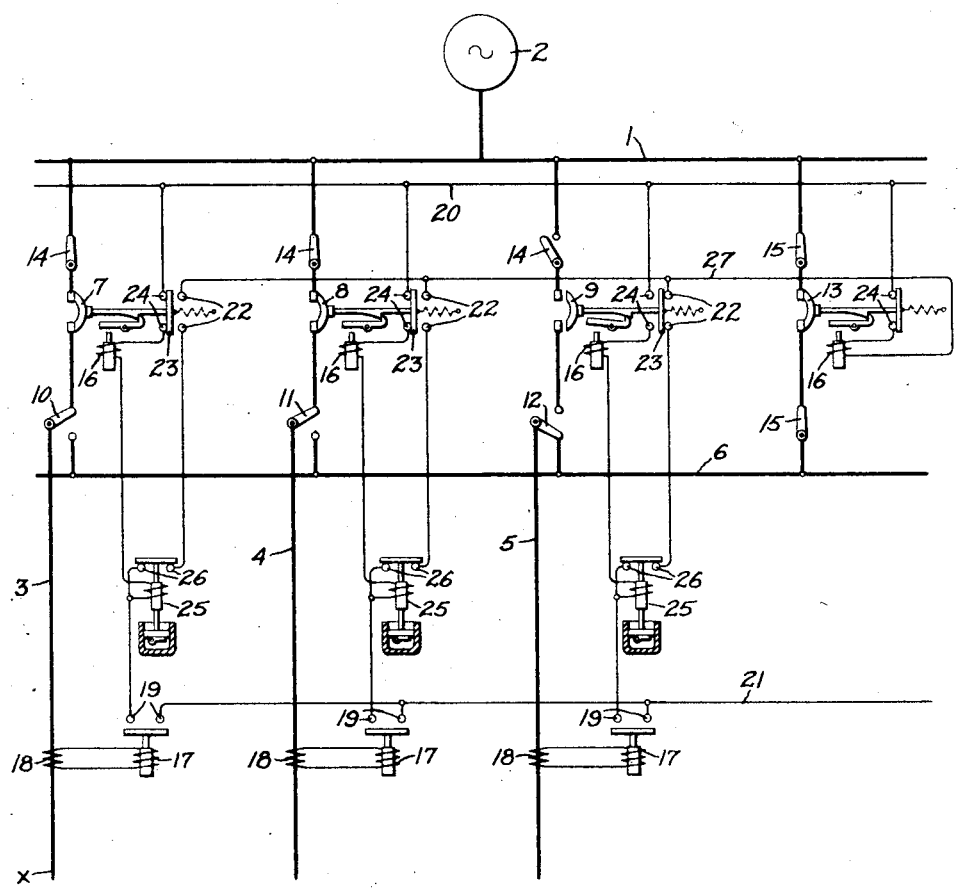

1,717,240

UNITED STATES PATENT OFFICE.

SAMPEI MIKI, OF TOKYO, JAPAN, ASSIGNOR TO GENERAL ELECTRIC COMPANY, A CORPORATION OF NEW YORK.

PROTECTIVE ARRANGEMENT.

Application filed September 21, 1927, Serial No. 220,929, and in Japan December 28, 1926.

My invention relates to improvements in protective arrangements for electric systems and more particularly to improvements in protective arrangements for a plurality of parallel feeders whereby inspection and maintenance of feeder circuit controlling apparatus is possible without sacrificing continuity of service on sound feeders.

My invention will be better understood from the following description when considered in connection with the accompanying drawing and its scope will be pointed out in the appended claims.

The single figure of the accompanying drawing illustrates diagrammatically in a single line diagram for clearness an embodiment of my invention in an electric system comprising a main bus 1 having a source 2 connected thereto and a plurality of feeders 3, 4, 5 each of which may be connected directly to the bus 1 or through a spare bus 6. For this purpose the feeders 3, 4, 5 have associated therewith circuit breakers 7, 8, 9 respectively and suitable switching means such as double throw disconnecting switches 10, 11, 12 whereby a feeder can be connected to either of the busses 1, 6 which are provided with suitable connecting means such as a bus tie or spare circuit breaker 13. Further disconnecting switches 14 may be provided for completely isolating a feeder circuit breaker so that it may be available for inspection, repair, etc., while its feeder is connected to the bus through the spare circuit breaker 13. This may also be provided with isolating switches 15. The circuit breakers 7, 8, 9, and 13 are shown as of the latched closed type and each is provided with a trip coil 16.

For protecting the system, there is provided means operative in response to a fault on a feeder to effect the opening of the circuit breaker through which the faulty feeder is connected to the main bus 1 whether it is the associated feeder circuit breaker or the spare circuit breaker 13. As shown this means comprises an over-current relay 17 of any suitable type associated with each feeder and connected in series relation therewith as through a current transformer 18 in case of an alternating current system. Each of these relays is arranged through its contacts 19 to connect the trip coil 16 of the circuit breaker of the feeder with which the relay is associated across a suitable control source such as auxiliary direct current busses 20, 21. There is also provided means for effecting the opening of the spare circuit breaker 13 in case of a fault on a feeder such as 5 which is connected to the bus 1 through this circuit breaker. As shown this means comprises a control circuit having normally open contacts 22, one set for each feeder arranged in parallel across the control source 20, 21. The contacts 22 are arranged to be closed on the disconnection of the feeder and for this purpose they may be controlled by an auxiliary switching member 23 associated with the feeder circuit breaker so as to bridge the contacts 22 when the circuit breaker is open. As is usual practice each of the circuit breakers may be provided with contacts 24 in their trip coil circuits arranged to be opened when the circuit breaker is opened in order to save the more delicate relay contacts 19 from interrupting the relatively heavy tripping current.

Assuming now that a fault were to occur as at $x$ on the feeder 3, then the relay 17 associated with this feeder will through its contacts 19 complete the circuit of the trip coil 16 of the circuit breaker 7 and thereby effect the disconnection of the feeder. I have found however that the opening of the circuit breaker 7 effects the energization of the trip coil circuit of the spare circuit breaker 13 because the circuit breaker auxiliary switch 24 closes its contacts 22 before the relay 17 has time to return to its contact opening position. This is of course bad since continuity of service on a sound feeder or feeders connected to the bus 1 through the circuit breaker 13 would be interrupted.

In order to prevent this undesirable action, I provide in accordance with my invention means for preventing the fault responsive means 17 associated with a faulty feeder which is directly connected to the bus 1 from effecting the opening of the spare circuit breaker 13. As shown this means comprises a relay 25 of the instantaneous circuit opening, time delay circuit closing type which is arranged to be controlled by the over-current relay 17 and to prevent the energization of the spare circuit breaker trip coil circuit on the disconnection of a faulty feeder connected to the bus 1 through its associated feeder circuit breaker. For this purpose the winding of the relay 25 may be arranged in series with the contacts of the over-current relay 17 as shown and the normally closed contacts 26 of the relay 25 may be arranged in series with the contacts 22 of the respective feeder circuit breaker auxiliary switch.

Now when a fault occurs on the feeder 3 as assumed before at $x$, the relay 25 controlled by the over-current relay 17 associated with this feeder will be energized at the same time the trip coil circuit of the circuit breaker 7 is completed. Consequently the relay 25 opens its contacts 26 substantially instantaneously and maintains them open for a time sufficient to allow the over-current relay 17 to open its contacts 19. Therefore, the control or trip coil circuit of the circuit breaker 13, including conductor 27, is maintained open at all times except when a fault occurs on a feeder such as 5 which may be connected to the bus 1 through the circuit breaker 13 as shown. In this case, the feeder circuit breaker 9 already being open, the contacts 22 associated therewith are closed and the contacts 24 open. Therefore the auxiliary relay 26 is not energized to open its contacts 26 and the closing of the over-current relay contacts 19 completes the circuit of the trip coil 16 of the circuit breaker 13. Similar operation occurs without regard to what feeder or feeders are connected to the respective busses.

While I have shown and described my invention in considerable detail, I do not desire to be limited to the exact arrangement shown, but seek to cover in the appended claims all those modifications that fall within the true spirit and scope of my invention.

What I claim as new and desire to secure by Letters Patent of the United States is:—

1. In combination, main and spare busses, a bus tie circuit breaker, a plurality of feeders, means for connecting the feeders directly to the main bus comprising a circuit breaker associated with each feeder and switching means adapted to be operated to connect a feeder to either bus, means operative in response to a fault on any feeder to effect the opening of the circuit breaker through which the feeder is connected to the main bus, and means for preventing the fault responsive means associated with a faulty feeder which is directly connected to the main bus from effecting the opening of the bus tie circuit breaker.

2. In combination, main and spare busses, means for connecting the busses, a plurality of feeders, means for connecting the feeders to the spare bus and also directly to the main bus, means for effecting the opening of the bus connecting means comprising a control circuit having normally open contacts arranged to be closed on the disconnection of a feeder directly connected to the main bus, fault responsive means associated with each feeder for effecting the opening of the means directly connecting the feeder to the main bus on the occurrence of a fault arranged to effect the energization of the control circuit on the occurrence of a fault on the feeder when connected to the main bus through the spare bus, and means controlled by said fault responsive means for preventing the energization of the control circuit by the fault responsive means associated with a feeder at fault while directly connected to the main bus.

3. In combination, main and spare busses, means for connecting the busses, a plurality of feeders, means for connecting the feeders directly to the main bus including means adapted to be operated to connect the feeders to the spare bus, means for effecting the opening of the bus connecting means comprising a control circuit having normally open contacts arranged to be closed on the disconnection of a feeder directly connected to the main bus, fault responsive means for effecting the opening of the means directly connecting a feeder to the main bus on the occurrence of a fault arranged to effect the energization of the control circuit on the occurrence of a fault on the feeder when connected to the main bus through the spare bus, and means including a relay arranged to be controlled by said fault responsive means for preventing the energization of the control circuit thereby when a feeder at fault is directly connected to the main bus.

4. In combination, main and spare busses, means comprising a circuit breaker for connecting said busses, a plurality of feeders, means for connecting the feeders directly to the main bus comprising a circuit breaker associated with each feeder and switching means adapted to be operated to connect a feeder to either bus, means operative in response to a fault on a feeder to effect the opening of the circuit breaker through which the feeder is connected to the main bus, and means controlled by said fault responsive means for preventing the fault responsive means associated with a faulty feeder which is directly connected to the main bus from effecting the disconnection of a feeder connected to the main bus through the spare bus.

5. In combination, a bus, a plurality of feeders, means for connecting the feeders to the bus including a circuit breaker associated with each feeder, switching means adapted to be operated to connect a feeder to the bus including a spare circuit breaker, means for effecting the opening of the spare circuit breaker including a control circuit having normally open contacts arranged to be closed on the opening of a feeder circuit breaker, fault responsive means for effecting the opening of a feeder circuit breaker in a faulty feeder arranged to effect the energization of the control circuit on the occurrence of a fault on the feeder when connected to the bus through the spare circuit breaker, and means controlled by said fault responsive means for preventing the energization of the control circuit thereby when a feeder at fault is connected to the bus through its associated circuit breaker.

6. In combination, a bus, a plurality of feeders, means for connecting the feeders to the bus including a circuit breaker associated with each feeder, switching means adapted to be operated to connect a feeder to the bus including a spare circuit breaker, means operative in response to a fault on a feeder to effect the opening of the circuit breaker through which the feeder is connected to the bus, and means controlled by the fault responsive means for preventing the fault responsive means of a faulty feeder when connected to the bus through its associated circuit breaker from effecting the disconnection of a feeder connected to the bus through the spare circuit breaker.

7. In combination, main and spare busses, a bus tie circuit breaker, a plurality of feeders, means for connecting the feeders directly to the main bus comprising a circuit breaker associated with each feeder and switching means adapted to be operated to connect a feeder to either bus, a trip circuit for effecting the opening of the bus tie circuit breaker, contacts in said circuit arranged to be closed on the opening of a feeder circuit breaker, fault responsive means associated with each feeder for effecting the opening of the feeder circuit breaker on the occurrence of a fault on the feeder and arranged to complete the trip circuit of the bus tie circuit breaker on the occurrence of a fault on a feeder when connected to the main bus through the spare bus, and the bus tie circuit breaker, and means controlled by said fault responsive means for preventing the completion of the trip circuit by the fault responsive means associated with a feeder at fault while directly connected to the main bus.

In witness whereof, I have hereunto set my hand this twenty-fifth day of August, 1927.

SAMPEI MIKI.